United States Patent [19]

Katsumata

[11] 4,146,806

[45] Mar. 27, 1979

[54] FLYWHEEL MAGNETO GENERATOR

[75] Inventor: Mitsuo Katsumata, Numazu, Japan

[73] Assignee: Kokusan Denki Co., Ltd., Numazu, Japan

[21] Appl. No.: 771,770

[22] Filed: Feb. 24, 1977

Related U.S. Application Data

[63] Continuation-in-part of Ser. No. 607,766, Aug. 26, 1975, abandoned.

[30] Foreign Application Priority Data

Aug. 26, 1974 [JP] Japan .................................. 49-101183

[51] Int. Cl.$^2$ ........................................... H02K 21/22
[52] U.S. Cl. .................................. 310/153; 310/156;
123/149 C; 123/149 D
[58] Field of Search ............... 310/153, 75, 156, 75 A,
310/74, 214, 67, 168; 74/572; 123/148 CC, 149 A, 149 C, 149 D; 322/49, 51, 91

[56] References Cited

U.S. PATENT DOCUMENTS

| | | | |
|---|---|---|---|
| 3,465,739 | 9/1969 | Burson | 123/148 CC |
| 3,619,634 | 11/1971 | Burson | 310/153 |
| 3,741,186 | 6/1973 | Doi | 123/148 CC |
| 3,821,570 | 6/1974 | Burson | 310/153 |
| 3,903,863 | 9/1975 | Katsumata | 123/149 D |
| 3,948,239 | 4/1976 | Katsumata | 123/149 |

Primary Examiner—R. Skudy
Attorney, Agent, or Firm—Woodling, Krost, Granger & Rust

[57] ABSTRACT

A flywheel magneto generator is disclosed, which includes a flywheel rotor, a stator disposed in the flywheel rotor and a signaling stator disposed outside said flywheel rotor. The flywheel rotor comprises a bowl-like flywheel, a plurality of arcuate permanent magnets engaged at the ends thereof with each other and aligned on the inner surface of the peripheral wall of the flywheel, and securing means for securing the magnets to the flywheel. The invention is characterized in that the securing means comprises a single wedge-like magnetic member interposed between the opposing ends of a pair of the permanent magnets and a screw coupling for coupling said wedge-like magnetic member to the peripheral wall and for urging said wedge-like magnetic member radially outwardly. The screw coupling is provided with an extending member of a magnetic material extending through the peripheral wall of the flywheel, magnetically insulated from the peripheral wall and having an outer end exposed outside the flywheel. The signaling stator is provided adjacent the peripheral wall of the flywheel so that the signaling stator is magnetically associated with the exposed end of the screw coupling.

8 Claims, 7 Drawing Figures

FLYWHEEL MAGNETO GENERATOR

This is a continuation-in-part application of the applicant's copending application Ser. No. 607,766 filed Aug. 26, 1975, now abandoned.

BACKGROUND OF THE INVENTION

This invention relates to a flywheel magneto generator and more particularly to a flywheel magneto generator for use in conjunction with an internal combustion engine.

A conventional flywheel magneto generator comprises a rotor having a bowl-like flywheel and a plurality of permanent magnets having respective pole pieces engaged thereon and secured by respective bolts to the peripheral wall of the flywheel. However, the pole pieces cannot be composed of laminated steel sheets because the bolts extend through the pole pieces in the radial direction, so that relatively large eddy current loss with resultant heat generation is caused in the pole pieces.

SUMMARY OF THE INVENTION

It is an object of the present invention to provide a flywheel magneto generator which does not require any pole pieces.

It is another object of the present invention to simplify the construction of a flywheel magneto generator.

A flywheel magneto generator according to the present invention includes a flywheel rotor, a stator disposed in the flywheel rotor and a signaling stator disposed outside the flywheel rotor. The flywheel rotor comprises a bowl-like flywheel and a plurality of arcuate permanent magnets engaged at the ends thereof with each other and aligned on the inner surface of the peripheral wall of the flywheel. The magnets are magnetized in the radial direction. The flywheel rotor also comprises securing means for securing the magnets to the flywheel. The securing means comprises a single wedge-like magnetic member interposed between the opposing ends of a pair of the magnets and screw coupling means for coupling said wedge-like magnetic member to the peripheral wall of the flywheel and urging said wedge-like magnetic member radially outwardly. The screw coupling means is provided with an extending member of a magnetic material extending through the peripheral wall of the flywheel, magnetically insulated from the perhipheral wall and having an outer end exposed outside the flywheel. The signaling stator is provided adjacent the peripheral wall of the flywheel so that the signaling stator is magnetically associated with the exposed end of the screw coupling means.

As the screw coupling means is tightened the wedge-like magnetic member is urged outwardly, so that compressive force is exerted upon the permanent magnets. Thus a single wedge-like magnetic member is capable of fixing a plurality of the magnets.

BRIEF DESCRIPTION OF THE DRAWINGS

Other features and advantages of the present invention will be apparent from the following description taken in conjunction with the accompanying drawings, in which.

DETAILED DESCRIPTION OF THE EMBODIMENT

Figure 1:
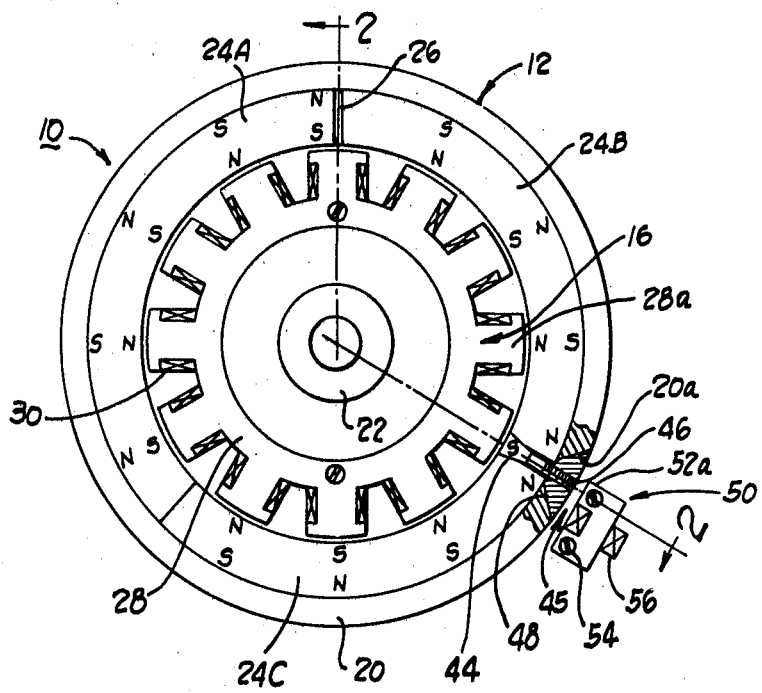
FIG. 1 is a front view of a flywheel magneto generator according to the present invention, with a portion being broken away.
Figure 2:
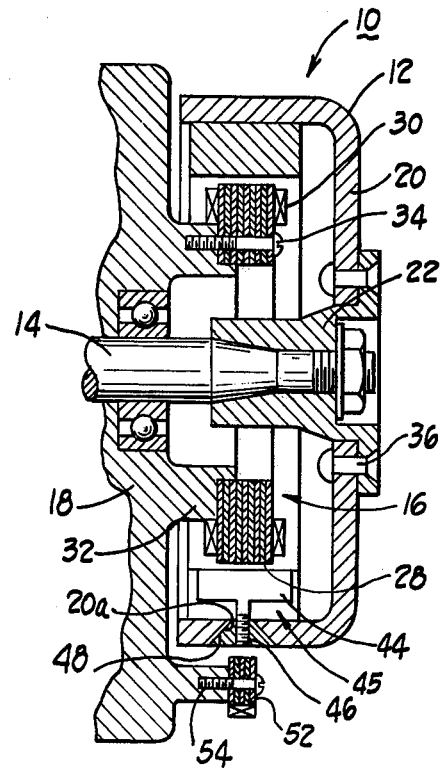
FIG. 2 is a sectional view taken along the line II—II of FIG. 1.

Referring now more particularly to FIGS. 1 and 2, there is shown a flywheel magneto generator 10 which comprises a rotor 12 driven by an engine shaft 14 and a stator 16 disposed inside the rotor and mounted on an engine case 18.

The rotor 12 comprises a bowl-like magnetic flywheel 20 having a boss 22 secured to the flywheel by rivets 36. The engine shaft 14 supports the boss 22 so that the flywheel rotates together with the engine shaft 14. In the embodiment illustrated, three arcuate permanent magnets 24A through 24C are disposed and aligned circumferentially on the inner surface of the peripheral wall of the flywheel 20. The magnets may be ferrite magnets made by sintering. Each of the permanent magnets is magnetized in a radial direction and alternately in opposite polarities, and the rotor as a whole is shown to have twelve poles. The magnetization of the permanent magnets may be effected after the permanent magnets (yet to be magnetized) and the flywheel are assembled. A spacer 26 may be interposed between the opposing ends of the permanent magnets 24A and 24B. The spacer serves to compensate for the error of the circumferential dimension of the permanent magnets. Such error is easy to occur when ferrite magnets are employed. The spacer may be composed of a soft non-magnetic material such as an aluminum alloy or hard rubber. The spacer may consist of a single sheet of such a material, or it may alternatively comprise a plurality of sheets. The number of the sheets may be determined to adjust to the dimensional error. The spacer also acts as a buffer to absorb any irregularities of the ends of the permanent magnets thereby preventing concentration of the stress. It will be understood that a similar spacer may be interposed between the opposing ends of the permanent magnets 24A and 24C.

Figure 5:
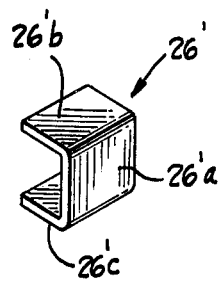
FIG. 5 is a perspective view of a modification of a spacer.
Figure 6:
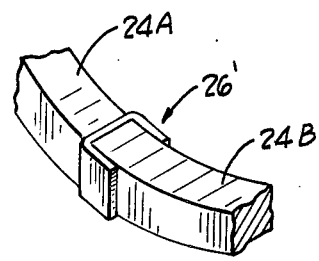
FIG. 6 shows how the spacer of FIG. 6 may be interposed between the permanent magnets.

FIGS. 5 and 6 show a different type of a spacer 26', which has a flat bottom wall 26a' and a pair of flat side walls 26b' and 26c' extending at right angles with the bottom wall 26a'. With this construction, the side walls 26b' and 26c' hold the magnets 24B between them as shown in FIG. 6, so that the spacer does not drop off the magnet during assembly of the rotor.

The permanent magnets are secured to the peripheral wall of the flywheel 20 by securing means which will be described later as well as by adhesive provided between the permanent magnets and the inner surface of the peripheral wall of the flywheel 20. The adhesives may be those having liquidity. But adhesives in the form of tape or ribbon may be preferred because they facilitate assembly of the rotor.

The stator 16 may comprise a ring-like core 28 of laminated steel sheets which is provided with twelve salient poles 28a having several coils 30 wound thereon. The coils 30 may include an ignition power coil, a lighting coil, and the like. The core 28 of the stator 16 may be mounted on a base 32 provided on the engine case 18 and secured thereto by bolts 34. It will be understood that the stator 16 is magnetically associated with the rotor 12 so that the coils have outputs induced therefrom as the rotor is driven by the engine shaft.

Figure 3:
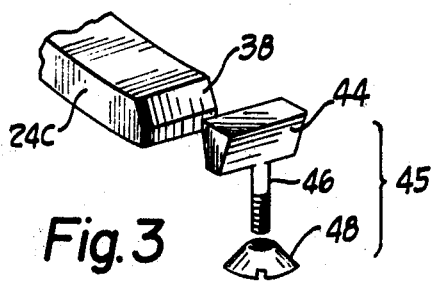
FIG. 3 is a perspective view of an end portion of one of the arcuate magnets and a wedge-like magnetic member together with a non-magnetic nut.

Securing means for securing the magnets to the flywheel comprises a wedge-like magnetic member 44 interposed between the opposing ends of the adjacent permanent magnets 24B and 24C. As shown in FIG. 3 the opposing ends of the permanent magnets 24B and 24C may be beveled at 38 so that the space between them is gradually increased toward the inner edges of the magnets to conform to the profile of the wedge-like magnetic member, and as a result as the magnetic member is moved radially outward the permanent magnets 24A, 24B and 24C are circumferentially compressed by the magnetic member 44.

The wedge-like magnetic member 44 is coupled by a screw coupling means 45 to the flywheel 20. The screw coupling means 45 may comprise an extending member which is shown to be a threaded magnetic stem portion 46 which in this embodiment is formed integrally with the wedge-like magnetic member 44 and is threadedly engaged by a non-magnetic tapered nut 48 which fits in a tapered hole 20a in the peripheral wall of the flywheel 20. As the nut 48 is tightened the stem 46 and the wedge 44 are forced or urged radially outward, with the result that the permanent magnets 24A to 24C are firmly secured to the flywheel. The outer end of the stem 46 is exposed outside the flywheel 20.

Figure 7:
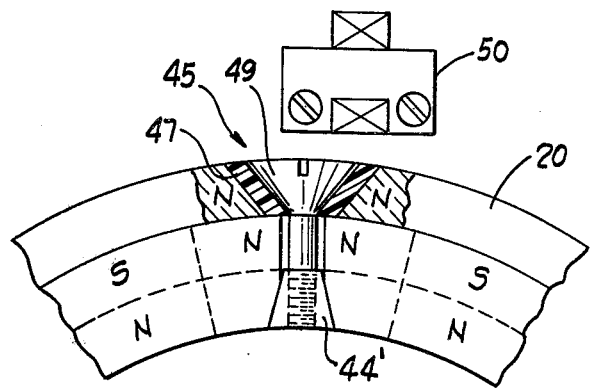
FIG. 7 is an enlarged front view of a part of a flywheel rotor illustrating a modification of a wedge-like magnetic member.

The screw coupling means 45 may alternatively comprise a magnetizable screw 49 threadedly engaged with the wedge-like magnetic member 44 as shown in FIG. 7. The screw 49 is magnetically insulated from the flywheel 20 by a non-magnetic collar 47.

Figure 4:
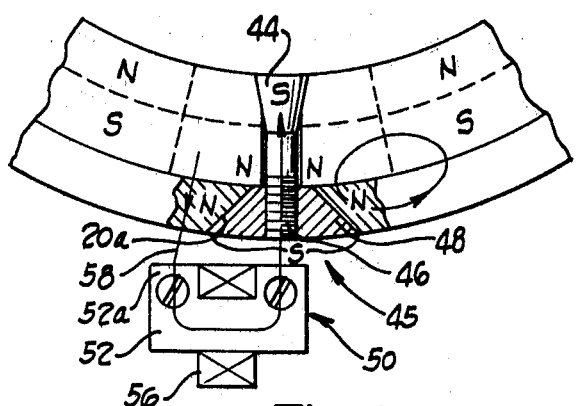
FIG. 4 is an enlarged view similar to FIG. 1 and shows how magnetic flux flows through the signaling stator and the wedge-like magnetic member.

The inner periphery of the magnetic member 44 is shown to be magnetized into an S-pole as shown in FIGS. 1 and 4. The S-pole is effectively extended to the outer periphery of the flywheel by the wedge-like magnetic member and the screw coupling means 46 or 49.

A signaling stator 50 is provided outside the flywheel 20. The signaling stator 50 is shown to comprise a U-shaped core 52, whose legs or poles 52a are in the proximity of the rotational path of the exposed outer end of the magnetic member 46 or 49. The core 52 may be mounted on another base 32a of the engine case 18 and is secured thereto by bolts 54. A signaling coil 56 is wound on the core 52.

As the flywheel 20 rotates, the signaling stator 50 is magnetically affected by the exposed end of the screw coupling means which in turn is magnetically connected to the wedge-like magnetic member. Thus, the signaling coil 56 has an igniting signal produced once during the revolution of the flywheel 20. FIG. 4 shows a path 58 of how a magnetic flux flows through the signaling stator 50 and the wedge-like magnetic member. The signal from the signaling coil is used to control a breakerless ignition circuit, not shown, to effect ignition of the internal combustion engine.

Although preferred embodiments of the present invention have been described and illustrated with reference to the accompanying drawing, various changes and modifications may be made within the spirit and scope of the present invention. It will, for example, be noted that only one of the opposing ends of the adjacent permanent magnets may be beveled and that the wedge-like magnetic member may have the profile conforming to the space between the adjacent ends of the permanent magnets. It should also be noted that adhesives may also be interposed between the ends of the permanent magnets in place of the spacer and likewise between the wedge-like magnetic member and the ends of the permanent magnets.

What is claimed is:

1. A flywheel magneto generator including a flywheel rotor, a stator disposed inside said flywheel rotor, and a signaling stator disposed outside said flywheel rotor, said flywheel rotor comprising a bowl-like flywheel, a plurality of arcuate permanent magnets mutually co-acting at the ends thereof with each other and aligned on the inner surface of the peripheral wall of said flywheel, said permanent magnets being magnetized in the radial direction, and securing means for securing said permanent magnets to said peripheral wall of said flywheel, characterized in that said securing means comprises a single wedge-like magnetic member interposed between the opposing ends of a pair of said permanent magnets, screw coupling means for coupling said wedge-like magnetic member to the peripheral wall of said flywheel and for urging said wedge-like magnetic member radially outwardly, said screw coupling means being provided with an extending member of a magnetic material extending through the peripheral wall of said flywheel and magnetically insulated from said peripheral wall of said flywheel, and having an outer end exposed outside said flywheel, and said signaling stator is provided adjacent said peripheral wall of said flywheel so that said signaling stator is magnetically associated with said exposed end of said screw coupling means.

2. A flywheel magneto generator as set forth in claim 1, further comprising at least one spacer interposed between said permanent magnets.

3. A flywheel magneto generator as set forth in claim 2, wherein said at least one spacer of an aluminum alloy.

4. A flywheel magneto generator as set forth in claim 2, wherein said at least one spacer of hard rubber.

5. A flywheel magneto generator as set forth in claim 1, wherein at least one of said opposing ends of said pair of said permanent magnets is beveled so that the space between them is gradually increased toward the inner edges of said permanent magnets so that the space between the beveled ends conforms to the profile of the wedge-like magnetic member.

6. A flywheel magneto generator as set forth in claim 1, wherein said screw coupling means comprises a threaded magnetic stem portion formed integrally with said wedge-like magnetic member and extending through said peripheral wall and a non-magnetic tapered nut threadedly engaged with said threaded stem portion, and fitting a tapered hole in said peripheral wall of said flywheel.

7. A flywheel magneto generator as set forth in claim 1, wherein said screw coupling means comprises a screw extending through said peripheral wall, threadably engaged with said wedge-like magnetic member and magnetically insulated from said peripheral wall of said flywheel by a non-magnetic member.

8. A flywheel magneto generator as set forth in claim 1, wherein said permanent magnets are fixed to said flywheel by adhesives.

* * * * *